(12) United States Patent
Kitamura et al.

(10) Patent No.: US 7,760,391 B2
(45) Date of Patent: Jul. 20, 2010

(54) IMAGE PROCESSING SYSTEM

(75) Inventors: Atsushi Kitamura, Tokyo (JP); Kimio Saitou, Tokyo (JP); Makoto Nishimura, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 1003 days.

(21) Appl. No.: 10/590,024

(22) PCT Filed: Jan. 11, 2005

(86) PCT No.: PCT/JP2005/000166

§ 371 (c)(1),
(2), (4) Date: Aug. 21, 2006

(87) PCT Pub. No.: WO2006/075354

PCT Pub. Date: Jul. 20, 2006

(65) Prior Publication Data

US 2007/0139721 A1    Jun. 21, 2007

(51) Int. Cl.
  *G06F 15/00* (2006.01)
  *G06K 1/00* (2006.01)
(52) U.S. Cl. ............... 358/1.5; 358/1.15; 382/151
(58) Field of Classification Search ............. 358/1.1, 358/1.5, 1.12, 1.15, 434, 448, 488; 382/145, 382/151
See application file for complete search history.

(56) References Cited

U.S. PATENT DOCUMENTS

| 4,485,447 | A  | * | 11/1984 | Ericsson ............... 700/125 |
| 6,449,516 | B1 | * | 9/2002  | Kyomasu et al. ......... 700/58 |
| 6,845,296 | B2 | * | 1/2005  | Ban et al. ............. 700/245 |

FOREIGN PATENT DOCUMENTS

| JP | 7-275771 A  | 10/1995 |
| JP | 10-320021 A | 12/1998 |

* cited by examiner

*Primary Examiner*—Thomas D Lee
(74) *Attorney, Agent, or Firm*—Sughrue Mion, PLLC

(57) ABSTRACT

An image processing system is provided that includes a first-motor control apparatus (40), having a communication interface (42) connected in series with a transmission line, for obtaining a detection position of a control subject and outputting a position-detection signal, an image processing apparatus (30), having a communication interface (32) connected in series with the transmission line and a memory (34) that stores the position-detection signal, for capturing an image of a workpiece (60) and generating an image-processing signal based on image processing, and a master apparatus (10) for implementing communication control of the image processing apparatus (30) and the first-motor control apparatus (40), and in which the image processing apparatus (10) starts the image processing, in accordance with an in-bound start command, stores in the memory (32) the position-detection signal, and outputs to the master apparatus (10) the position-detection signal along with the image-processing signal.

6 Claims, 5 Drawing Sheets

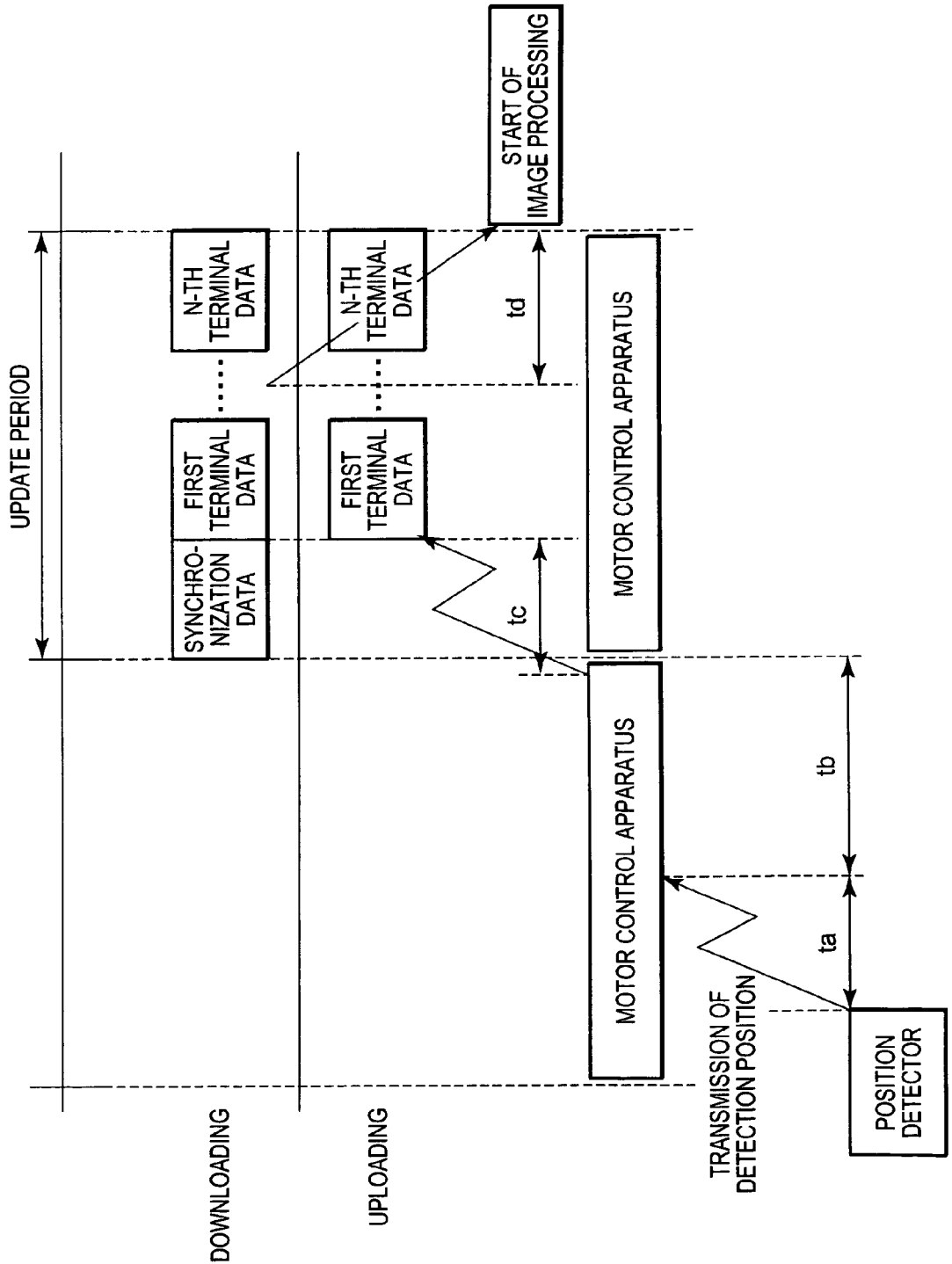

IMAGE PROCESSING SYSTEM

TECHNICAL FIELD

The present invention relates to an image processing system in which a position-detection signal at the time when an image is captured and an image-processing signal from an image processing apparatus are synthesized and transmitted to a master apparatus.

BACKGROUND ART

In a conventional image processing system, a position information apparatus transmits to a master apparatus the detection position of a control subject as a position-detection signal, through a transmission line, an image processing apparatus starts image processing, in accordance with a start command from the master apparatus, and an image-processing signal obtained through the image processing is transmitted to the master apparatus. As a prior art such as this, Patent Reference 1 below is known.
(Patent Reference 1) Japanese Laid-Open Patent Publication No. 1998-320021

DISCLOSURE OF THE INVENTION

However, in the foregoing image processing system, the position-detection signal at the time when the image processing apparatus starts image processing is not accurate, and when the position-detection signal and the image-processing signal are synthesized in the master apparatus, both the signals are not synchronized; therefore, it has been a problem that high precision in position detection cannot be obtained.

The present invention has been implemented in order to solve the foregoing problem; it is an object of the present invention to provide an image processing system in which the synchronization in synthesizing the position signal and the image-processing signal is implemented rapidly and with precision.

An image processing system according to the first aspect of the present invention is characterized by including a position information apparatus, having a communication interface connected in series with a transmission line, for obtaining a detection position of a control subject and outputting a position-detection signal, an image processing apparatus, having a communication interface connected in series with the transmission line and a storage means that stores the position-detection signal, for capturing an image of a subject and generating an image-processing signal based on image processing, and a master apparatus for implementing communication control of the image processing apparatus and the position control apparatus, and characterized in that the image processing apparatus starts the image processing, in accordance with an in-bound start command, stores in the storage means the position-detection signal, and outputs to the master apparatus the position-detection signal along with the image-processing signal.

An image processing apparatus in an image processing system according to the second aspect of the present invention is characterized in that the image processing apparatus synthesizes the position-detection signal with the image-processing signal and outputs the synthesized signal to the master apparatus.

An image processing apparatus in an image processing system according to the third aspect of the present invention is characterized in that the image processing apparatus obtains as a first corrected position signal the position, of the control subject, at the time when the start command is issued, by, based on the amount of change in the position-detection signal and an update period for the position-detection signal, correcting the position-detection signal.

An image processing apparatus in an image processing system according to the fourth aspect of the present invention is characterized in that the image processing apparatus obtains as a second corrected position signal the position, of the control subject, at the time when the start command is issued, by, based on an update period, in a transmission line, for the position-detection signal, correcting the position-detection signal.

An image processing system according to the fifth aspect of the present invention is characterized in that an ID code or an output-delay-time value for the position-detection signal is provided to the position information apparatus, and the image processing apparatus obtains as a third corrected position signal the position, of the control subject, at the time when the start command is issued, by, based on the ID code or the output-delay-time value, correcting the position-detection signal.

A master apparatus in an image processing system according to the sixth aspect of the present invention is characterized in that, by, through computing, obtaining a communication delay time of the transmission line and an output delay time of the position-detection signal and, by way of the transmission line, setting in the storage means of the image processing apparatus the communication delay time and the output delay time, thereby correcting the position-detection signal, the position, of the control subject, at the time when the start command is issued is obtained as a fourth corrected position signal.

According to the first aspect, the image processing apparatus starts the image processing, in accordance with an in-bound start command, stores in the storage means the position-detection signal, and outputs to the master apparatus the position-detection signal along with the image-processing signal; therefore, the position-detection signal and the image-processing signal at the time when image processing is started can simultaneously be obtained by the master apparatus. As a result, the fusion of the position-detection signal from the position information apparatus and the image-processing signal from the image processing apparatus demonstrates an effect in which the precision in position detecting is raised.

According to the second aspect, the image processing apparatus synthesizes the position-detection signal with the image-processing signal and outputs the synthesized signal to the master apparatus; therefore, that synthesis by the master apparatus is not required, whereby an effect is demonstrated in which a processing load on the master apparatus is reduced.

According to the third aspect, the image processing apparatus obtains as a first corrected position signal the position, of the control subject, at the time when the start command is issued, by, based on the amount of change in the position-detection signal and an update period for the position-detection signal, correcting the position-detection signal; therefore, an effect is demonstrated in which the fusion of the image-processing signal and the position-detection signal can precisely be achieved.

According to the fourth aspect, the image processing apparatus obtains as a second corrected position signal the position, of the control subject, at the time when the -start command is issued, by, based on an update period, in a transmission line, for the position-detection signal, correcting the position-detection signal; therefore, an effect is demonstrated in which the fusion of the image-processing signal and the position-detection signal can precisely be achieved.

According to the fifth aspect, an ID code or an output-delay-time value for the position-detection signal is provided to the position information apparatus, and the image processing apparatus obtains as a third corrected position signal the position, of the control subject, at the time when the start command is issued, by, based on the ID code or the output-delay-time value, correcting the position-detection signal; therefore, an effect is demonstrated in which the fusion of the image-processing signal and the position-detection signal can precisely be achieved.

According to the sixth aspect, by, through computing, obtaining a communication delay time of the transmission line and an output delay time of the position-detection signal and, by way of the transmission line, setting in the storage means of the image processing apparatus the communication delay time and the output delay time, thereby correcting the position-detection signal, the position, of the control subject, at the time when the start command is issued is obtained as a fourth corrected position signal; therefore, an effect is demonstrated in which the fusion of the image-processing signal and the position-detection signal can precisely be achieved.

BRIEF DESCRIPTION OF DRAWINGS

FIG. 7 is a time chart of a position-detection signal for an image processing system according to Embodiment 3.

DESCRIPTION OF SYMBOLS

10 MASTER APPARATUS
22, 24, 26 SERIAL-PAIR CABLE
30 IMAGE PROCESSING APPARATUS
32, 42, and 52 INTERFACE
40 FIRST-MOTOR CONTROL APPARATUS
50 SECOND-MOTOR CONTROL APPARATUS
60 WORKPIECE
70 XY TABLE

BEST MODE FOR CARRYING OUT THE INVENTION

Embodiment 1

Figure 1:
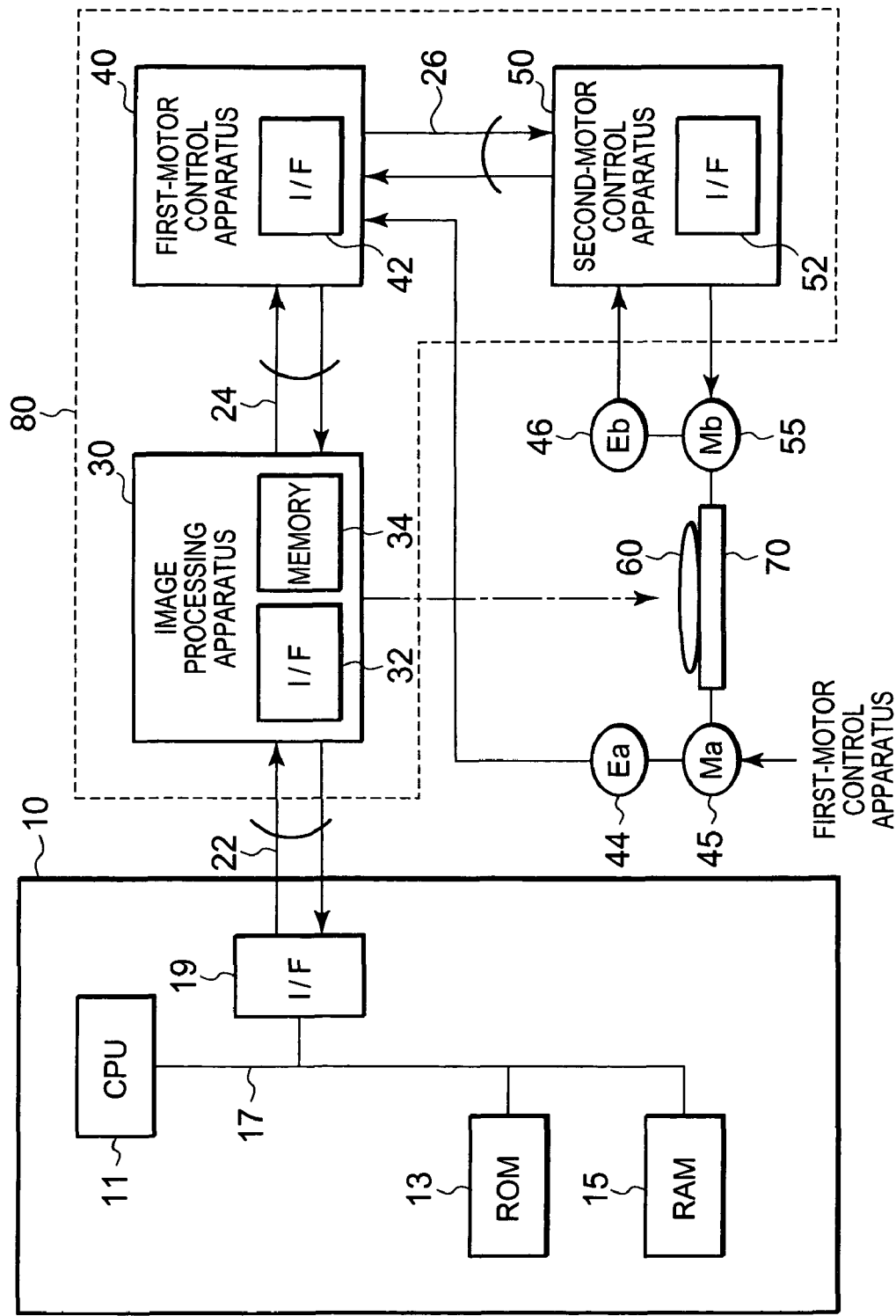
FIG. 1 is an overall block diagram illustrating an image processing system according to Embodiment 1 of the present invention.
Figure 2:
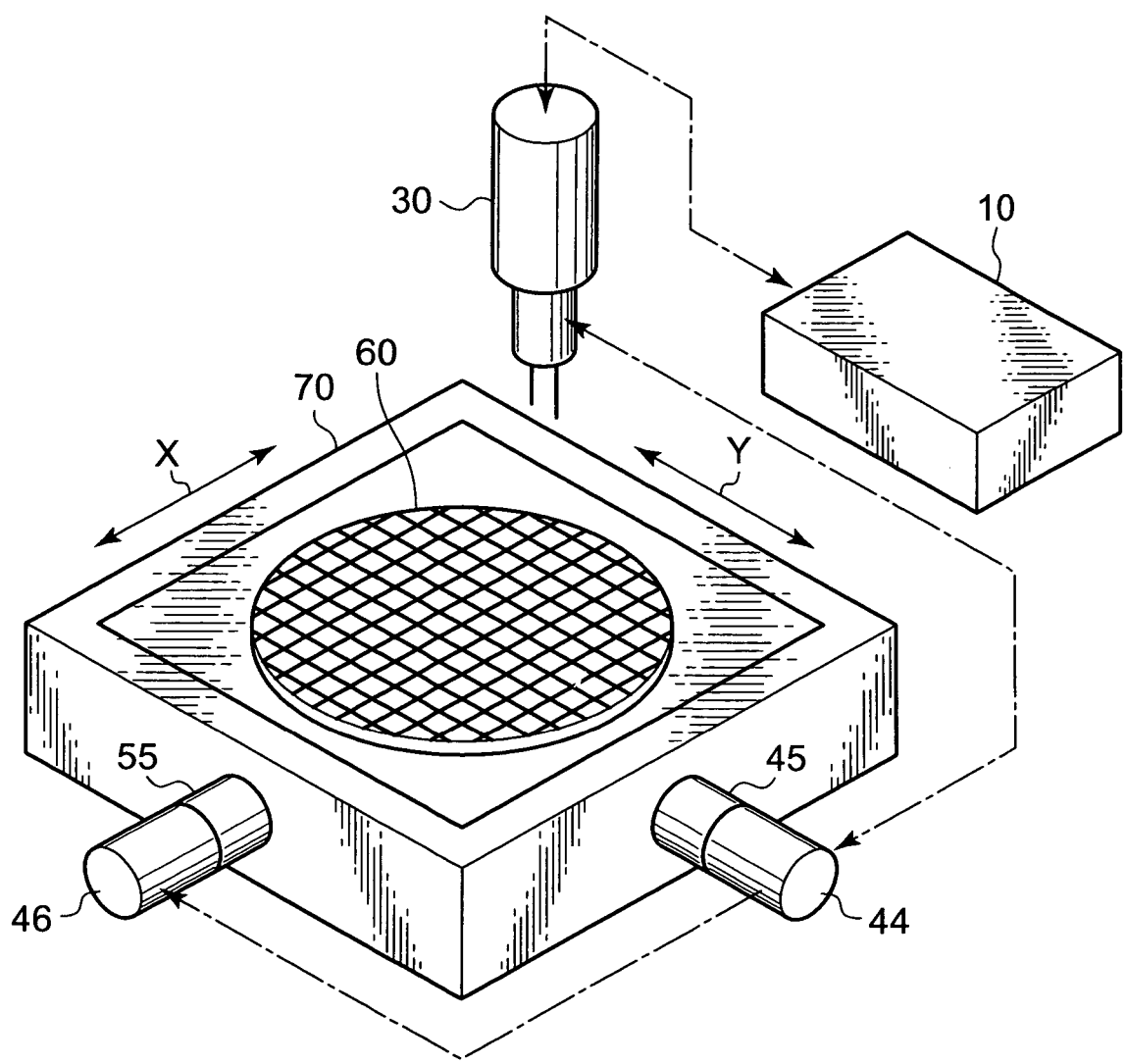
FIG. 2 is a perspective view illustrating an image processing system according to Embodiment 1.
Figure 3:
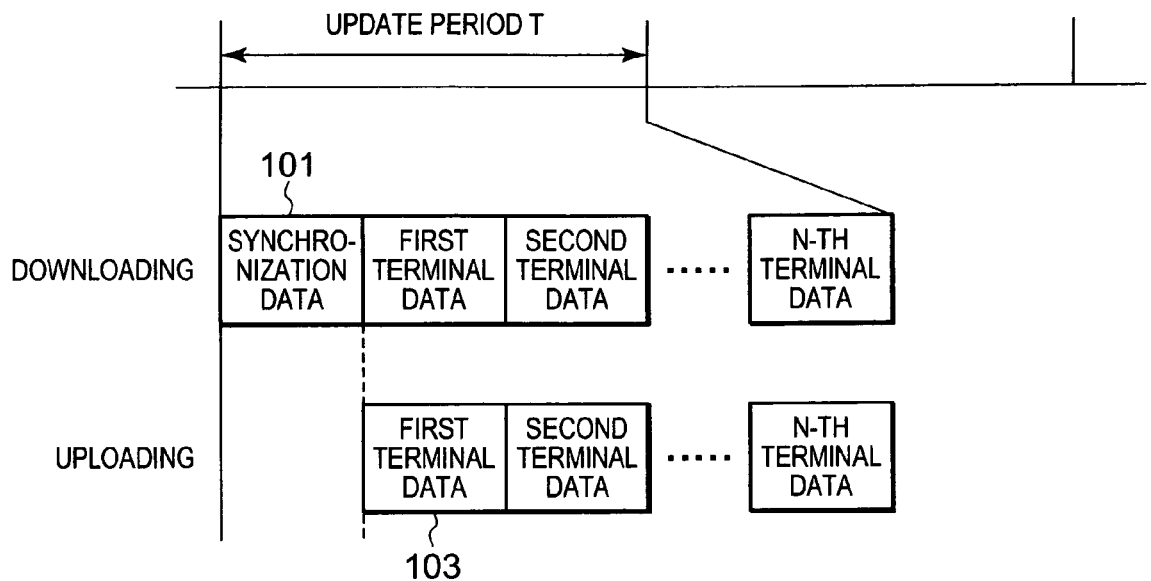
FIG. 3 is a chart representing a configuration of data transmitted and received through a transmission line in an image processing system according to Embodiment 1.
Figure 4:
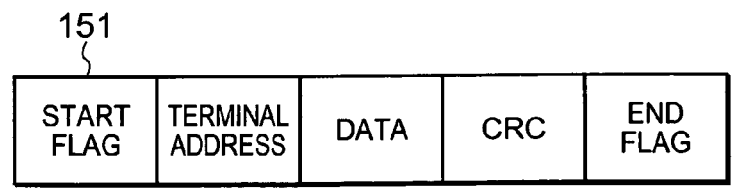
FIG. 4 is a chart representing a configuration of data for an image processing system according to Embodiment 1.
Figure 5:
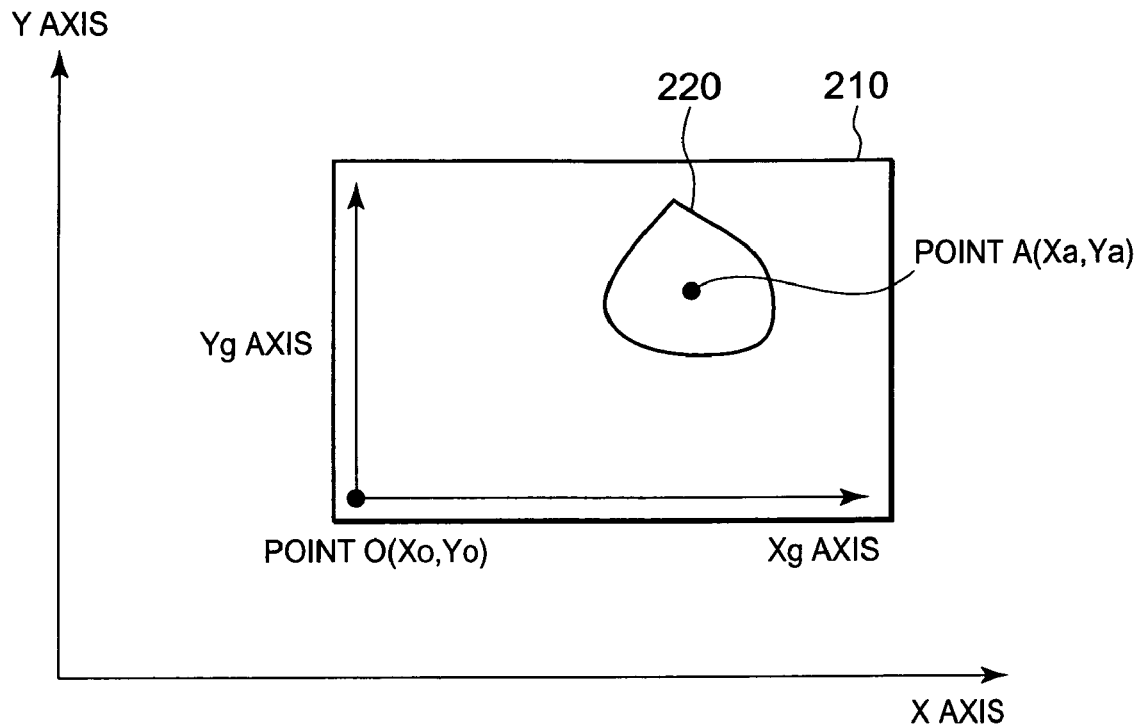
FIG. 5 is an image-information chart for an image processing system according to Embodiment 1.

One embodiment of the present invention will be explained with reference to FIGS. 1 to 5. FIG. 1 is a block diagram illustrating an image processing system according to Embodiment 1; FIG. 2 is a perspective view illustrating an overall image processing system including an imaging apparatus that captures the image of a semiconductor chip by a camera; FIG. 3 is a chart representing a configuration of data transmitted and received through a transmission line in an image processing system; FIG. 4 is a chart representing a data configuration for an image processing system; and FIG. 5 is a curve chart representing information on an image captured by an image processing apparatus and a detection position detected by a position detector. In FIGS. 1 and 2, an XY table 70 has a first motor 45 for moving the XY table 70 in the X-axis directions and a second motor 55 for moving the XY table 70 in the Y-axis directions. A workpiece 60, as semiconductor chips, that is not positioned specifically is placed on the XY table 70.

The image processing system has a master apparatus 10 that generates a positional instruction and the like; through a first high-speed serial pair cable 22, an image processing apparatus 30 that captures the image of the workpiece 60, implements image processing to detect an accurate position, and outputs an image processing signal is connected to the master apparatus 10. The image processing apparatus 30 is connected to a first-motor control apparatus 40 as a first-position information apparatus, by way of a second high-speed serial pair cable 24. A second-motor control apparatus 50, as a second-position information apparatus that outputs a second-position detection signal, is connected to the first-motor control apparatus 40, by way of a third high-speed serial pair cable 26. The master apparatus 10, the image processing apparatus 30, the first-motor control apparatus 40, and the second-motor control apparatus 50 are daisy-chain connected in series, whereby the image processing system is formed by utilizing a reduced number of wires.

With the rotation axles of the first and second motors 45 and 55, a first-position detector 44 and a second-position detector 46 are coupled, respectively, that detect the respective pivoting positions of the motors, thereby detecting a first detection position and a second detection position, respectively.

The first-motor control apparatus 40 is formed in such a way as to obtain the first detection position through two pulse signal trains having respective phases, i.e., A and B phases, thereby outputting the first-position detection signal and controlling the first motor 45. Similarly, the second-motor control apparatus 50 is formed in such a way as to obtain the second detection position, thereby transmitting the second-position detection signal and controlling the second motor 55.

The master apparatus 10 has a CPU 11, a ROM 13 that stores a program for controlling the operation of the CPU 11, a RAM 15 as a work area, and a bus 17 that connects the foregoing constituent elements; to the bus 17, a high-speed serial-communication interface (I/F) 19 is connected that is used for implementing serial communication between the image processing apparatus 30 and the first-motor control apparatus 40, and between the first-motor control apparatus 40 and the second-motor control apparatus 50 (the image processing apparatus 30, the first-motor control apparatus 40, and the second-motor control apparatus 50 are referred to as a detection apparatus 80, hereinafter). The CPU 11 is formed in such a way as to, based on program processing, obtain by way of the interface 19 a detection position, or the like, that is transmitted from the detection apparatus 80, through the transmission line consisting of the first, second, and third cables 22, 24, and 26 and to transmit a command signal to the detection apparatus 80, through the transmission line.

The image processing apparatus 30 includes a communication interface (I/F) 32 that communicates with the master apparatus 10 and a memory 34 that stores respective detection positions, detected by the first-position and second-position detectors 44 and 46, and the like. The first-motor control apparatus 40 has a communication interface (I/F) 42 for outputting the first-position detection signal to the transmission line. The second-motor control apparatus 50 has a communication interface (I/F) 52 for outputting to the transmission line the second-position detection signal as a position signal.

As illustrated in FIG. 1, the high-speed serial communication is established as intercommunication, having two transmission lines, consisting of downloading communication in which, through the first, second, third cables 22, 24, and 26, communication is implemented from the master apparatus 10 to the detection apparatus 80 and uploading communication in which, through the first, second, third cables 22, 24, and 26, communication is implemented from the detection apparatus 80 to the master apparatus 10. As represented in FIG. 3, in the downloading communication, the master apparatus 10 outputs to the transmission line downloading-communication data 101, at a constant processing period. As far as the downloading-communication data 101 is concerned, in the first place, synchronization data is outputted; then, commands to the detection apparatus 80 connected to each transmission line are outputted in the order of terminal number, e.g., first terminal data to the image processing apparatus 30, second terminal data to the first-motor control apparatus 40, and third terminal data to the second-motor control apparatus 50 in that order, up to N-th terminal data. As represented in FIG. 3, in the uploading communication, the detection apparatus 80 outputs to the transmission line uploading-communication data 103, at a constant processing period, e.g., the first terminal data and the second terminal data in that order, up to the N-th terminal data.

As represented in FIG. 4, the N-th terminal data 151 in the downloading communication is formed of a start flag, a terminal address, data, CRC, and an end flag in that order. In this situation, the start flag indicates the start of data transmission, the terminal address is information indicating a data receiver or a data sender, the data indicates transmission data, the CRC is a check signal for securing the reliability of a transmission signal, and the end flag is data indicating the respective ends of a series of data-transmission packages.

The detection apparatus 80 ascertains with the terminal address whether the command is sent to it, and then receives and applies processing to the command from the master apparatus 10. Respective rotary switches are provided in the apparatuses that are included in the detection apparatus; the terminal addresses are set in such a way that the setting numbers for the rotary switches do not duplicate.

In contrast, the uploading communication is formed in such a way that, after receiving the synchronization data 21, the detection apparatus 80 sequentially implements, in accordance with the terminal address and in a time-division fashion, transmission of the information consisting of the start flag, the terminal address, the data, the CRC, and the end flag in that order, as is the case with the downloading transmission. Accordingly, the detection apparatus 80 receives based on the terminal address commands from the master apparatus 10, through the downloading communication, and periodically outputs position information in accordance with the transmission format in FIG. 4, through the uploading communication.

The image processing apparatus 30 periodically receives respective detection positions, detected by the first-position and second-position detectors 44 and 46, among transmission data items, for the other terminals, excluding data for the image processing apparatus 30, receives based on the terminal address commands from the master apparatus 10, through the downloading communication, and periodically outputs data in accordance with the transmission format in FIG. 3, through the uploading communication.

Next, FIG. 5 represents the relationship between the result of image capturing and processing, by the image processing apparatus 30, of the workpiece 60 and the respective detection positions detected by the position detectors 44 and 46. In FIG. 5, the X axis and the Y axis denote the vector directions of the first-position and second-position detectors 44 and 46, respectively. Reference Numeral 210 designates the screen of the image processing apparatus 30; Reference Numeral 220, the image, of the workpiece 60, captured by the image processing apparatus 30; and Point "O", the reference coordinates $(X_0, Y_0)$ of the image processing apparatus 30. The Xg axis and the Yg axis for the screen 210 denote the X-axis direction and the Y-axis direction, respectively, for the image by the image processing apparatus 30; and Point "A", the gravity-center data (Xa, Ya), for the workpiece 60, computed by the image processing apparatus 30. In this situation, it is assumed that the Xg axis and the Yg axis for the image processing apparatus 30 coincide with the X axis and the Y axis, respectively, that indicate the XY coordinates for the XY table 41, i.e., the directions of the coordinate axes for the first-position and second-position detectors 44 and 46, respectively. The image-detection position detected by the image processing apparatus 30 and the first and second detection positions detected by the first-position and second-position detectors 44 and 46 are in the same units.

Assuming that the first and second detection positions that have been stored in the memory 34 when the image processing apparatus 30 starts image processing are indicated by (X21, Y31), the gravity-center coordinates (Xc, Yc), of the workpiece 60, obtained through image capturing and processing by the image processing apparatus 30 are given by the following equation:

$$(Xc, Yc) = (X21, Y31) + (Xa, Ya)$$

The image processing apparatus 30 outputs to the transmission line the gravity-center coordinates (Xc, Yc), as a position signal, obtained by processing and synthesizing the first and second detection positions and the image-processing signal, and then transmits the position signal to the master apparatus 10. Accordingly, the master apparatus 10 can use the processed and synthesized position signal outputted by the image processing apparatus 30, without implementing computing processing.

The operation of the image processing system configured as described above will be explained with reference to FIGS. 1 to 5. In order to make the image processing apparatus 30 implement, in accordance with a program, image processing of image data, the master apparatus 10 transmits through the interface 19 the image-processing start command, as a data 33, to the image processing apparatus 30.

In accordance with the image-processing start command received as the data 33, through the downloading communication by way of the transmission line, the image processing apparatus 30 captures the image of the workpiece 60, starts image processing, and stores in the memory 34 the first and second detection positions, detected by the first-position and second-position detectors 44 and 46, that have been transmitted to the uploading transmission line.

After completion of the image processing, the image processing apparatus 30 transmits to the master apparatus 10, through the uploading communication by way of the transmission line, information on the gravity-center position of the workpiece 60 and the first and second detection positions at the time when the image processing apparatus 30 has started the image processing.

As described above, the image processing system according to the present embodiment is formed in such a way that the respective serial-communication interfaces 19, 42, 52, and 32 are provided in the master apparatus 10, the first-motor and second-motor control apparatuses 40 and 50, and the image processing apparatus 30 in that order, and with the serial-communication interfaces 19, 42, 52, and 32 connected serially in a daisy-chain fashion, communication is implemented. Accordingly, the image processing apparatus 30 can obtain from the first-position and second-position detectors 44 and 46 the first and second detection positions at the time when the image processing starts. Thus, the image processing apparatus 30 can output a position signal as information obtained by combining the image processing signal obtained through image processing with the first and second detection positions detected by the first-position and second-position detectors 44 and 46. As a result, the master apparatus 10 can obtain from the image processing apparatus 30 the position signal to which correction processing has been applied.

In addition, in the case where the image processing apparatus 30 is used, work items of implementing well-known so-called "calibration", i.e., orienting vectors of the coordinate systems to the same direction, and of defining the actual distance per screen pixel should be carried out.

Embodiment 2

Figure 6:
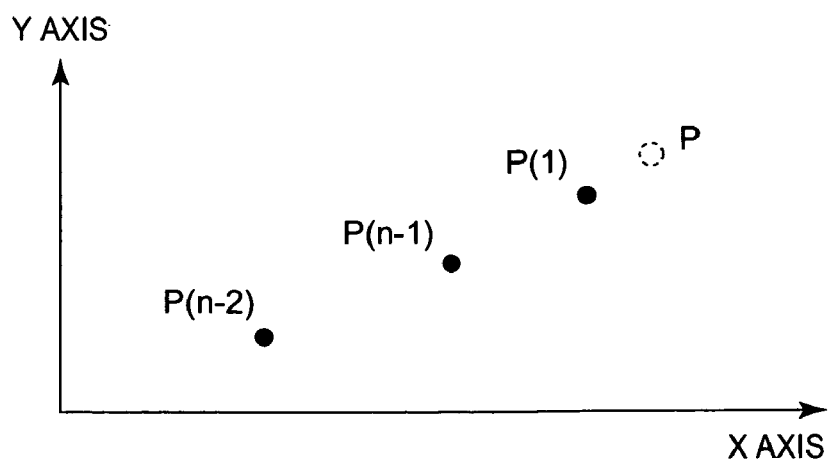
FIG. 6 is a chart representing a state during update of position information for an image processing system according to Embodiment 2.

Another embodiment of the present invention will be explained with reference to FIGS. 1 and 6. FIG. 6 is a curve chart representing the results of reading, by a first and second image processing apparatuses, of detection positions detected by position detectors. In FIG. 6, $P(n-2)$ indicates a detection position obtained twice previously; $P(n-1)$, a detection position obtained once previously; and $P(n)$, the present detection position. When receiving the image-processing start command from the master apparatus 10, the image processing apparatus 30 cannot start image processing immediately; thus, some sort of delay time occurs.

Meanwhile, even when, in the case where the XY table 70 keeps moving, the image processing apparatus 30 stores a detection position in the memory 34, in a precise sense, the recorded detection position is not the detection position at the time when the image-processing start command is issued. Therefore, in order to obtain the detection position at the time when the image-processing start command is issued, correction processing of a detection position is required.

Specifically, when the correction processing of a detection position is implemented by utilizing two points, i.e., the present position information $P(n)$ and the last position information $P(n-1)$, and letting $iT$ and $\Delta t$ denote the update period for the detection position and the delay time of the image processing apparatus 30, respectively, the image processing apparatus 30 solves the following first-degree simultaneous equations so as to obtain constants a and b.

$$y1 = ax1 + b$$

$$y2 = ax2 + b$$

where x1 and x2 are the positions at the time of t1 and at the time of t2, respectively. The corrected position Ph for the position at the time when the image-processing start command is issued is given by the following equation. In other words, a first-position correction signal as a first-position correction position is obtained based on the update period for the detection position and the amount of change in the first detection position.

$$Ph = P(n) + \{P(n) - P(n-1)\}/(iT \cdot \Delta t)$$

In addition, in the case where the correction is implemented by utilizing three points, the image processing apparatus 30 solves the following simultaneous equations each represented by a two-degree equation, e.g., $y = ax^2 + bx + c$, so as to obtain constants a, b, and c.

$$aX1^2 + BX1 + c = y1$$

$$aX2^2 + bX2 + c = y2$$

$$aX3^2 + bX3 + c = y3$$

where x3 is the positions at the time of t3.

The corrected position Ph for the position at the time when the image-processing start command is issued is given by the following equation.

$$Ph = \{P(n-2) - 2P(n-1) + P(n)\}/(2iT) \cdot A \cdot A + \{-P(n-2) + 4P(n-1) - 3P(n)\}/(2iT) \cdot A + P(n)$$

where A is $\Delta t/iT$.

In Embodiment 2, the methods for correcting the position information may be switched, e.g., between two-point correction in the case where the constant-speed command is issued and three-point correction for acceleration or deceleration duration, by utilizing a position command signal from the master apparatus 10.

Embodiment 3

Another embodiment of the present invention will be explained with reference to FIGS. 1, 2, and 7. FIG. 7 is a time chart representing the duration from the position detection to the time when the image processing apparatus obtains position information. The foregoing embodiments have been explained without considering the respective communication delay times of the first-position and second-position detectors and the first-motor and second-motor control apparatuses 40 and 50; however, in fact, the delay times occur. An image processing system will be explained that, by correcting the delay times, starts processing at the same time as that of the issue of the image-processing start command.

A delay time ta occurs when the first and second detection positions are transmitted from the first-position and second-position detectors 44 and 46 to the first-motor and second-motor control apparatuses 40 and 50, respectively. A delay time tb occurs when the first-motor and second-motor control apparatuses 40 and 50 correct the received first and second detection positions so as to generate motor control commands and outputs to the transmission line the present detection positions of the first and second motors 45 and 55, by way of the communication interfaces 42 and 52, respectively. In serial communication over the transmission line, timing at which transmission is enabled is set for each terminal number. Accordingly, it is not until the first-motor and second-motor control apparatuses 40 and 50 have their turn to implement communication that the present detection positions can be transmitted to the transmission line; therefore, a delay time tc occurs.

The image processing apparatus 30 receives the image-processing start command and in order to obtain all detection positions stably, starts image processing in synchronization with the synchronization signal in the following update period; therefore, a delay time td occurs. Accordingly, even though the image processing apparatus 30 stores in the memory 34 the detection position at the time when image-processing start command is issued, the time when the detection position is detected is behind the time when the XY table moves. Accordingly, by setting the delay time, i.e., the duration from the time when the first-position and second-position detectors 44 and 46 detect detection positions to the time when, by way of the motor control apparatuses 40 and 50, the image processing apparatus 30 starts image processing, and by substituting the delay time for Δt in the computation equation, the change, due to the delay time, in the detection position is corrected, whereby a third corrected position signal is obtained. As a result, the accurate detection position at the time when the image-processing start command is issued can be detected by the image processing apparatus 30.

A method may be employed in which, at initial communication, the first-motor and second-motor control apparatuses 40 and 50 send ID signals or delay-time setting values for the image processing apparatus 30 and the like and then the image processing apparatus 30 sets a delay-time value based on the ID signal or the delay-time setting value.

In addition, the time when the image processing apparatus 30 starts image processing is behind the time when the first-motor and second-motor control apparatuses 40 and 50 detect detection positions, by the time corresponding to the update period, i.e., the sum of the delay times tc and td; therefore, it is preferable to correct also the sum of the delay times tc and td. Additionally, it has been explained that the image processing apparatus 30 corrects the delay time, based on the position signals from the first-motor and second-motor control apparatuses 40 and 50; however, the master apparatus 10 may set a delay time based on the ID signal or the delay-time setting value. The position signal corrected as described above is a fourth corrected position signal as termed in the present invention.

INDUSTRIAL APPLICABILITY

An image processing system according to the present invention is suitable to detect through a position detector the pivoting position of a motor to implement image processing of a workpiece, and to control the motor or the like, by utilizing positions obtained through the image processing.

What is claimed is:

1. An image processing system comprising:
   a position information apparatus, having a communication interface connected in series with a transmission line, for obtaining a detection position of a control subject and outputting a position-detection signal;
   an image processing apparatus, having a communication interface connected in series with the transmission line and a storage means that stores the position-detection signal, for capturing an image of a subject and generating an image-processing signal based on image processing; and
   a master apparatus for implementing communication control of the image processing apparatus and the position information apparatus, wherein the image processing apparatus starts the image processing, in accordance with an in-bound start command, stores in the storage means the position-detection signal, and outputs to the master apparatus the position-detection signal along with the image-processing signal.

2. The image processing system according to claim 1, wherein the image processing apparatus synthesizes the position-detection signal with the image-processing signal and outputs the synthesized signal to the master apparatus.

3. The image processing system according to claim 1 or 2, wherein the image processing apparatus obtains as a first corrected position signal the position, of the control subject, at the time when the start command is issued, by, based on the amount of change in the position-detection signal and an update period for the position-detection signal, correcting the position-detection signal.

4. The image processing system according to claim 1 or 2, wherein the image processing apparatus obtains as a second corrected position signal the position, of the control subject, at the time when the start command is issued, by, based on the update period, in the transmission line, for the position-detection signal, correcting the position-detection signal.

5. The image processing system according to claim 1 or 2, wherein an ID code or an output-delay-time value for the position-detection signal is provided to the position information apparatus, and the image processing apparatus obtains as a third corrected position signal the position, of the control subject, at the time when the start command is issued, by, based on the ID code or the output-delay-time value, correcting the position-detection signal.

6. The image processing system according to claim 1 or 2, wherein, by through computing, obtaining a communication delay time of the transmission line and an output delay time of the position-detection signal and, by way of the transmission line, setting in the storage means of the image processing apparatus the communication delay time and the output delay time, thereby correcting the position-detection signal, the master apparatus obtains as a fourth corrected position signal the position, of the control subject, at the time when the start command is issued.

* * * * *